United States Patent
Kim et al.

(10) Patent No.: US 9,897,858 B2
(45) Date of Patent: Feb. 20, 2018

(54) DISPLAY APPARATUS

(71) Applicant: Samsung Display Co., Ltd., Yongin (KR)

(72) Inventors: Young Gu Kim, Hwaseong-si (KR); Byung-Chul Kim, Goyang-si (KR); Hwa Sung Woo, Asan-si (KR); Baekkyun Jeon, Yongin-si (KR); Min-Sik Jung, Seoul (KR)

(73) Assignee: Samsung Display Co., Ltd, Yongin-si (KR)

( * ) Notice: Subject to any disclaimer, the term of this patent is extended or adjusted under 35 U.S.C. 154(b) by 673 days.

(21) Appl. No.: 14/524,812

(22) Filed: Oct. 27, 2014

(65) Prior Publication Data

US 2015/0301376 A1    Oct. 22, 2015

(30) Foreign Application Priority Data

Apr. 21, 2014 (KR) .................. 10-2014-0047456

(51) Int. Cl.
*G02F 1/1339* (2006.01)
*G02F 1/1337* (2006.01)
*G02F 1/1362* (2006.01)

(52) U.S. Cl.
CPC ........ *G02F 1/1337* (2013.01); *G02F 1/13394* (2013.01); *G02F 1/136227* (2013.01)

(58) Field of Classification Search
CPC ........... G02F 1/13394; G02F 1/133377; G02F 1/136227; G02F 1/1337
USPC .......................................................... 349/156
See application file for complete search history.

(56) References Cited

U.S. PATENT DOCUMENTS

| 7,852,450 | B2 | 12/2010 | Kim et al. | |
|---|---|---|---|---|
| 8,755,020 | B2 | 6/2014 | Nagashima | |
| 2012/0105759 | A1* | 5/2012 | Park | G02F 1/13394 349/43 |
| 2012/0268702 | A1* | 10/2012 | Imanishi | G02F 1/13394 349/124 |

FOREIGN PATENT DOCUMENTS

| JP | 4266057 | 5/2009 |
|---|---|---|
| JP | 2009282262 | 12/2009 |
| JP | 2011081226 | 4/2011 |
| JP | 2013130774 | 7/2013 |
| KR | 10-2007-0049769 | 5/2007 |
| KR | 10-2012-0044778 | 5/2012 |

* cited by examiner

*Primary Examiner* — Nathanael R Briggs
*Assistant Examiner* — William Peterson
(74) *Attorney, Agent, or Firm* — H.C. Park & Associates, PLC

(57) ABSTRACT

A display apparatus includes a first substrate, a second substrate, and a spacer. The first substrate includes pixel areas including first and second pixel areas adjacent to each other and arranged in a matrix form defined by first and second directions substantially perpendicular to each other. The second substrate faces the first substrate. The spacer is disposed on the second substrate to extend toward the first substrate. Each of the pixel areas includes a pixel electrode and a thin film transistor connected to the pixel electrode through a contact hole.

20 Claims, 5 Drawing Sheets

DISPLAY APPARATUS

CROSS-REFERENCE TO RELATED APPLICATION

This application claims priority from and the benefit of Korean Patent Application No. 10-2014-0047456, filed on Apr. 21, 2014, which is hereby incorporated by reference for all purposes as if fully set forth herein.

BACKGROUND

Field

Exemplary embodiments relate to a display apparatus. More particularly, the present disclosure relates to a display apparatus having an improved display quality.

Discussion of the Background

A liquid crystal display includes two substrates and a liquid crystal layer interposed between the two substrates. The liquid crystal display includes a backlight unit to supply light to the liquid crystal layer and the liquid crystal layer includes liquid crystal molecules.

The liquid crystal display includes a spacer disposed between the two substrates. The spacer maintains a distance between the two substrates and absorbs external impact applied thereto.

When external contact forces are applied to a lower substrate among the substrates, a position of the spacer may be changed. The spacer returns to its original position when the external contact forces applied to the lower substrate are removed.

Due to the change in position of the spacer, an alignment layer disposed on the lower substrate may be damaged and the damaged alignment layer does not properly control the alignment of the liquid crystal molecules. Consequently, light leakage occurs in an area corresponding to the damaged alignment layer.

In addition, when the spacer does not return to the original position thereof, the liquid crystal molecules arranged around the spacer are misaligned due to the change in the position of the spacer. Consequently, light leakage occurs around the spacer.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display apparatus capable of reducing light leakage to improve a display quality thereof.

Additional aspects will be set forth in the detailed description which follows, and, in part, will be apparent from the disclosure, or may be learned by practice of the inventive concept.

Exemplary embodiments of the inventive concept provide a display apparatus including a first substrate that includes pixel areas including a first pixel area and second pixel area, the first pixel area and the second pixel area being adjacent to each other in a first direction, a second substrate that faces the first substrate, and a spacer disposed on the second substrate to extend toward the first substrate. Each of the pixel areas includes a pixel electrode and a thin film transistor connected to the pixel electrode through a contact hole. The first pixel area includes a first contact hole, the second pixel area includes a second contact hole, the spacer is disposed at a position between the first contact hole and the second contact hole, and at least one of a position at which the first contact hole is disposed in the first pixel area and a position at which the second contact hole is disposed in the second pixel area is different from a position at which a contact hole is disposed in at least one pixel area other than the first and second pixel areas.

According to the above, although the position of the spacer is changed, the alignment layer may be prevented from being damaged. Thus, the light leakage occurring in the display apparatus may be reduced, and the display quality of the display apparatus may be improved.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the inventive concept.

The above and other features and advantages of the present disclosure will become readily apparent by reference to the following detailed description when considered in conjunction with the accompanying drawings.

DETAILED DESCRIPTION OF THE ILLUSTRATED EMBODIMENTS'

Figure 1:
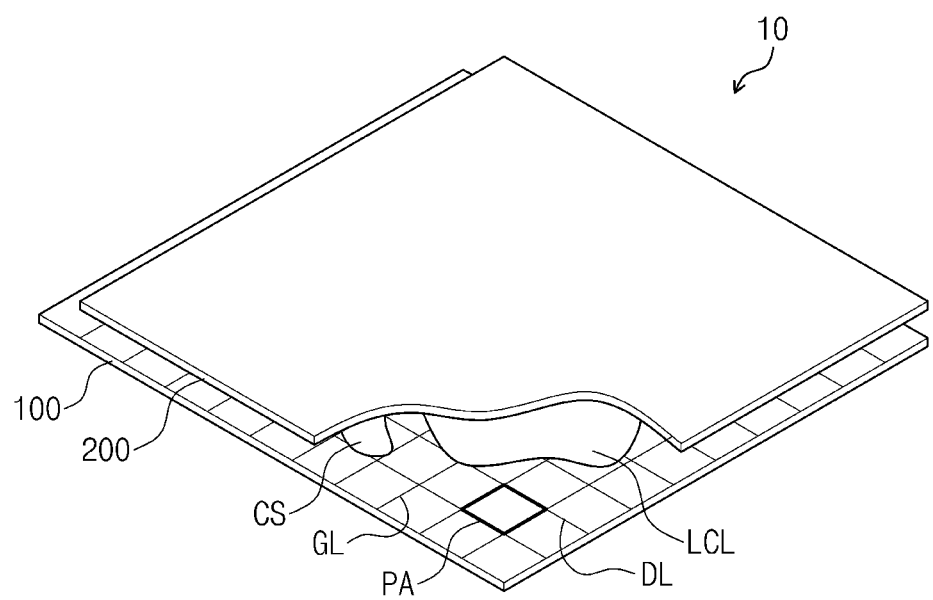
FIG. 1 is a perspective view showing a display apparatus according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a display apparatus according to an exemplary embodiment of the present disclosure will be explained in detail with reference to the accompanying drawings.

The display apparatus may be one of various display apparatuses, such as a liquid crystal display apparatus, a plasma display apparatus, an electrophoretic display apparatus, an electrowetting display apparatus, etc. Hereinafter, the liquid crystal display apparatus will be described as the display apparatus according to exemplary embodiments of the present disclosure.

Figure 2:
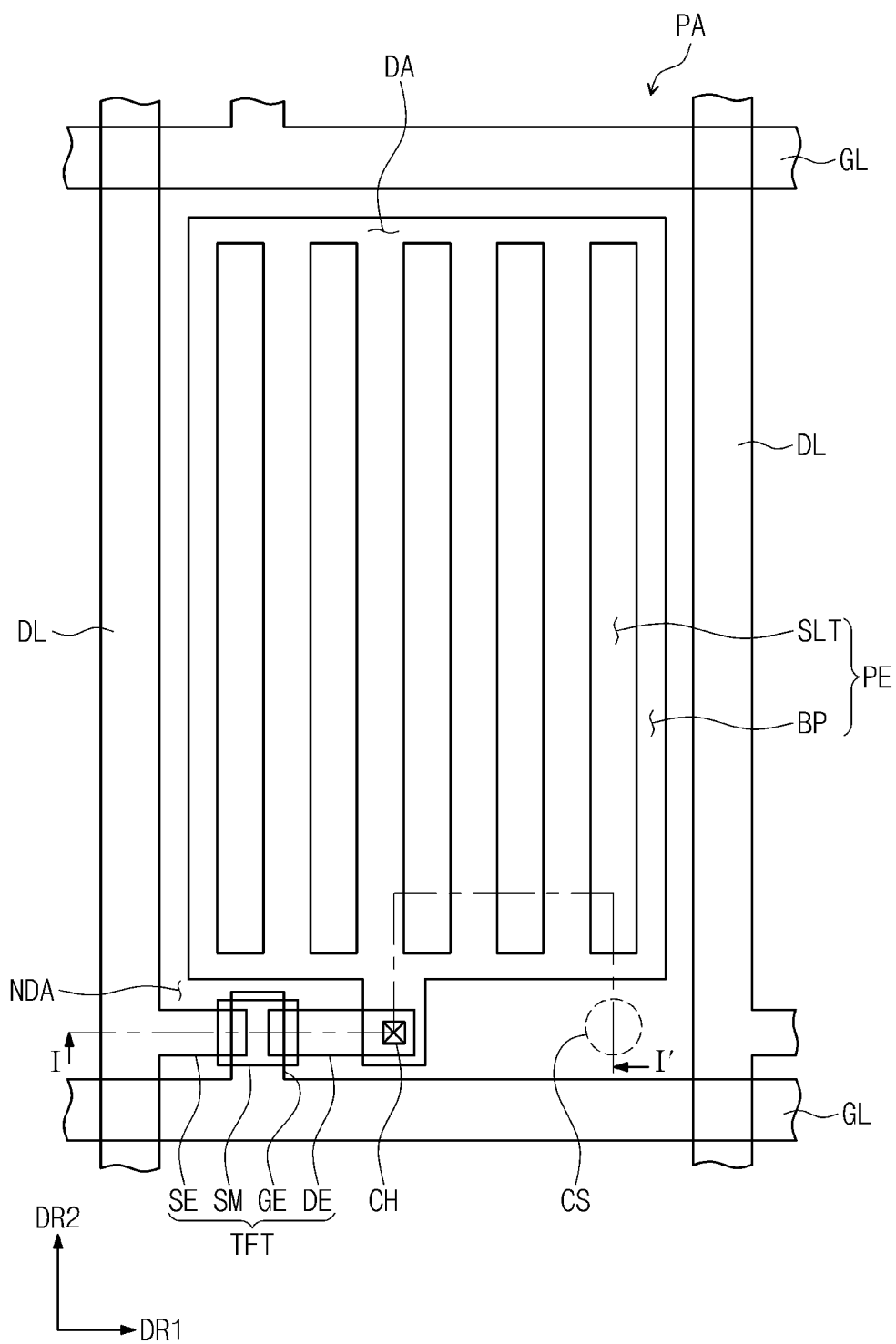
FIG. 2 is a plan view showing a pixel area according to an exemplary embodiment of the present disclosure.
Figure 3:
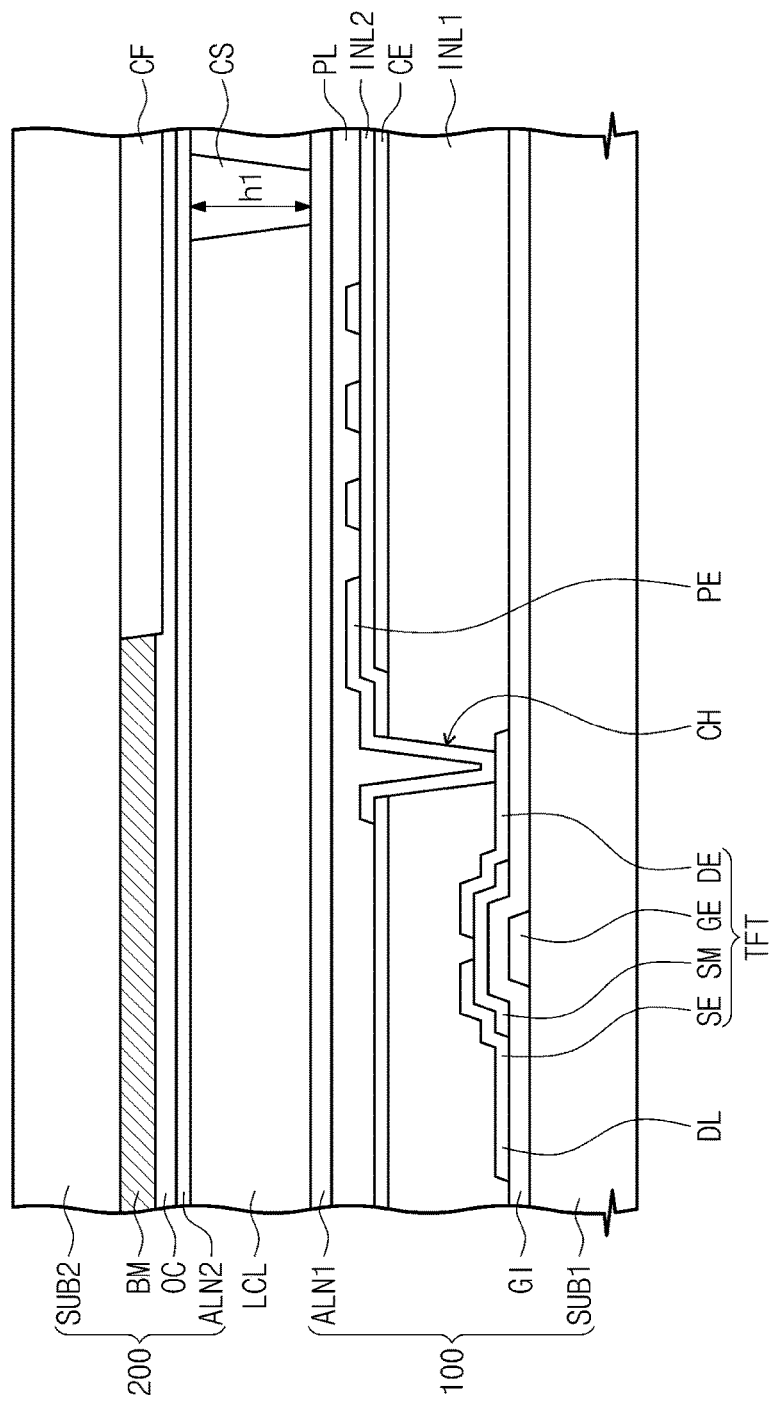
FIG. 3 is a cross-sectional view taken along a line I-I' of FIG. 2.

FIG. 1 is a perspective view showing a display apparatus 10 according to an exemplary embodiment of the present disclosure, FIG. 2 is a plan view showing a pixel area according to an exemplary embodiment of the present disclosure, and FIG. 3 is a cross-sectional view taken along a line I-I' of FIG. 2. In detail, FIG. 2 shows a pixel area related to a horizontal switching mode, but aspects should not be limited thereto or thereby; for example, the pixel area may be related to a vertical alignment mode or a twisted nematic mode.

Referring to FIGS. 1, 2 and 3, the display apparatus 10 includes a first substrate 100, a second substrate 200 facing the first substrate 100, a liquid crystal layer LCL, and a spacer CS. The liquid crystal layer LCL and the spacer CS are disposed between the first substrate 100 and the second substrate 200.

The first substrate 100 includes a display area DA in which the image is displayed and a non-display area NDA in which no image is displayed.

The first substrate 100 includes a plurality of pixel areas PA. The pixel areas PA will be described in detail later.

The first substrate 100 includes a first base substrate SUB1, a thin film transistor TFT, a pixel electrode PE, and a common electrode CE.

The first base substrate SUB1 may be a transparent insulating substrate, such as a plastic substrate, a glass substrate, or a quartz substrate.

Gate lines GL and data lines DL are disposed on the first base substrate SUB1. The gate lines GL extend in a first direction DR1 on the first base substrate SUB1. The data lines DL extend in a second direction DR2 crossing the first direction DR1 on the first base substrate SUB1 and are insulated from the gate lines GL. To this end, a gate insulating layer GI is disposed between the gate lines GL and the data lines DL.

The thin film transistor TFT includes a gate electrode GE, a semiconductor pattern SM, a source electrode SE, and a drain electrode DE.

The gate electrode GE is branched from the gate line GL or provided at a portion of the gate line GL. The gate electrode GE may include a metal material. The gate electrode GE may have a multi-layer structure. The gate electrode GE may include at least one of nickel, chromium, molybdenum, aluminum, titanium, copper, tungsten, or alloys thereof.

The gate insulating layer GI is disposed on the gate electrode GE. The gate insulating layer GI is disposed over an entire surface of the first base substrate SUB1 to cover the gate line GL and the gate electrode GE.

The semiconductor pattern SM is disposed on the gate insulating layer GI. The semiconductor pattern SM is disposed on the gate electrode GE while the gate insulating layer GI is disposed between the gate electrode GE and the semiconductor pattern SM. Thus, a portion of the semiconductor pattern SM is overlapped with the gate electrode GE.

The source electrode SE is branched from or provided at a portion of the data line DL. A portion of the source electrode SE is overlapped with the gate electrode GE.

The drain electrode DE is spaced apart from the source electrode SE, and the semiconductor pattern SM is disposed between the drain electrode DE and the source electrode SE. A portion of the drain electrode DE is overlapped with the gate electrode GE.

The source electrode SE and the drain electrode DE have a multi-layer structure. The source electrode SE and the drain electrode DE may include at least one of nickel, chromium, molybdenum, aluminum, titanium, copper, tungsten, or alloys thereof.

The common electrode CE forms an electric field in cooperation with the pixel electrode PE to drive the liquid crystal layer LCL.

The common electrode CE is disposed on a first insulating layer INL1. The first insulating layer INL1 may include a plurality of organic layers and/or inorganic layers.

The common electrode CE includes a transparent conductive material. The common electrode CE may include a conductive metal oxide, such as indium tin oxide (ITO), indium zinc oxide (IZO), indium tin zinc oxide (ITZO), etc. The common electrode CE may be formed through various methods, e.g., a photolithography process. In the present exemplary embodiment, the pixel electrode PE is disposed on the common electrode CE, but aspects should not be limited thereto or thereby; for example, the pixel electrode PE may be disposed under the common electrode CE.

The pixel electrode PE is connected to the drain electrode DE through a contact hole CH.

Referring to FIG. 2, the pixel electrode PE includes a plurality of slits SLT and a plurality of branch portions BP alternately arranged with the slits SLT. The branch portions BP may be connected to each other at one or both ends.

Referring to FIGS. 1 to 3, the pixel electrode PE is disposed on a second insulating layer INL2. The second insulating layer INL2 may have a multi-layer structure, e.g., a plural or double-layer structure of an organic layer and/or an inorganic layer. The second insulating layer INL2 protects the thin film transistor TFT and planarizes an upper surface of the first base substrate SUB1 on which the thin film transistor TFT is disposed.

The contact hole CH is formed by etching or penetrating the first insulating layer INL1 and the second insulating layer INL2.

The pixel electrode PE includes a transparent conductive material. The pixel electrode PE includes a transparent conductive oxide, e.g., ITO, IZO, ITZO, etc. The pixel electrode PE may be formed through various methods, e.g., a photolithography process.

A protection layer PL is disposed on the second insulating layer INL2 to protect the pixel electrode PE. A first alignment layer ALN1 is disposed on the protection layer PL. The first alignment layer ALN1 is used to pre-tilt liquid crystal molecules of the liquid crystal layer LCL.

The first alignment layer ALN1 is configured to include a single alignment layer or a base alignment layer and an alignment forming layer.

The second substrate 200 includes a second base substrate SUB2, a black matrix BM, and a color filter CF. However aspects need not be limited thereto such that the black matrix BM and the color filter CF may be included in the first substrate 100.

The second base substrate SUB2 may be a transparent insulating substrate, e.g., a plastic substrate, a glass substrate, a quartz substrate, etc.

The black matrix BM is disposed on the second substrate SUB2 to correspond to a light blocking area of the first substrate 100. The light blocking area corresponds to an area in which the data line DL, the thin film transistor TFT, and the gate line GL are disposed. The pixel electrode PE is not disposed in the light blocking area, and thus the liquid crystal molecules are not aligned, which may cause light leakage. Thus, the black matrix BM is disposed in the light blocking area to decrease the light leakage. The black matrix BM may be formed by forming a light blocking layer absorbing a light and patterning the light blocking layer through a photolithography process, however it should not be limited thereto or thereby. For instance, the black matrix BM may be formed by an inkjet method.

The color filter CF is disposed on the second base substrate SUB2 and assigns colors to the light passing through the liquid crystal layer LCL. The color filter CF is formed by forming a color layer that represents red, green, and blue colors on the second base substrate SUB2 and patterning the color layer using a photolithography process, but it should not be limited thereto or thereby. For example, the color filter CF may be formed by an inkjet method.

An overcoat layer OC is disposed on the black matrix BM and the color filter CF to planarize the second substrate 200.

A second alignment layer ALN2 is disposed on the overcoat layer OC. The second alignment layer ALN2 is used to pre-tilt the liquid crystal molecules of the liquid crystal layer LCL.

The second alignment layer ALN2 is configured to include a single alignment layer or a base alignment layer and an alignment forming layer.

The liquid crystal layer LCL includes the liquid crystal molecules having a dielectric anisotropy. The liquid crystal molecules in the liquid crystal layer LCL are rotated in a specific direction between the first substrate 100 and the second substrate 200 when the electric field is formed between the pixel electrode PE and the common electrode CE of the first substrate 100, and thus a transmittance of the light passing through the liquid crystal layer LCL is controlled.

The display apparatus 10 includes the spacer CS.

The spacer CS disposed on the second substrate 200 and protrudes or extends from the second substrate 200 toward the first substrate 100.

The spacer CS maintains a distance between the first substrate 100 and the second substrate 200 and absorbs external impacts applied thereto.

The spacer CS is overlapped with the non-display area NDA. For instance, the spacer CS is overlapped with the non-display area NDA when viewed in a thickness direction of the display apparatus 10, i.e., when viewed from the first substrate 100 to the second substrate 200. Further, the spacer CS may be partially or completely disposed in the non-display area NDA.

The spacer CS has a height h1 corresponding to or substantially the same as a cell gap between the first substrate 100 and the second substrate 200. Accordingly, the spacer CS contacts the first substrate 100 and the second substrate 200 to maintain the cell gap.

The spacer CS may be disposed on the second substrate 200. For instance, the spacer CS may be disposed on the overcoat layer OC. Further, the spacer CS may be disposed on the second alignment layer ALN2 disposed on the overcoat layer OC.

The spacer CS may be formed on the second substrate 200 using a photolithography process.

The spacer CS may be provided in a plural number, e.g., two, three or more. The number of the spacers CS may be about 1/200 to about 1/100 of the number of the pixel areas PA. When the number of the spacers CS is less than about 1/200, the cell gap between the first substrate 100 and the second substrate 200 may be difficult to maintain, and when the number of the spacers CS exceeds about 1/100, visibility of the display apparatus 10 may be compromised.

Figure 4A:
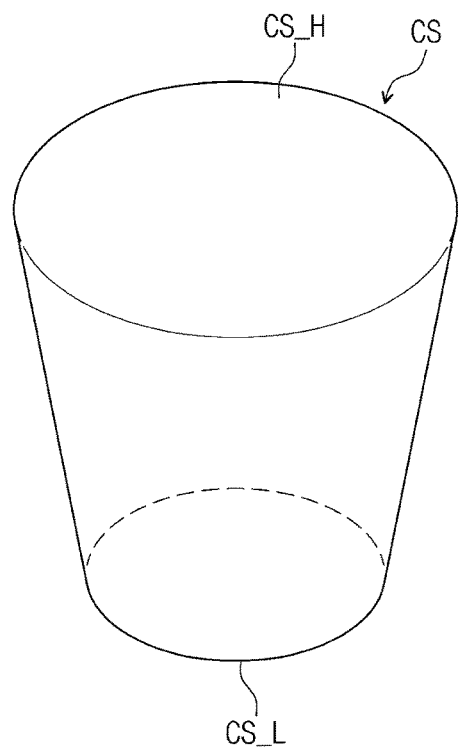
FIG. 4A is a perspective view showing a spacer according to an exemplary embodiment of the present disclosure.
Figure 4B:
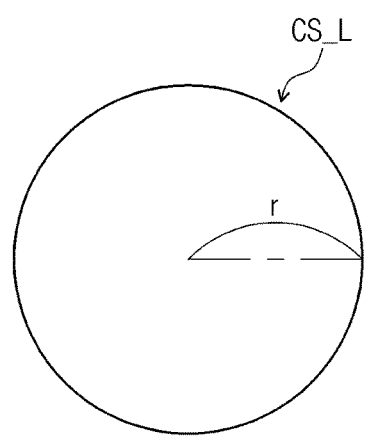
FIG. 4B is a cross-sectional view showing a spacer according to an exemplary embodiment of the present disclosure.

FIG. 4A is a perspective view showing a spacer according to exemplary embodiments of the present disclosure and FIG. 4B is a cross-sectional view showing a spacer according to an exemplary embodiment of the present disclosure.

Referring to FIGS. 4A and 4B, the spacer CS includes a spacer upper surface CS_H making contact with a lower surface of the second substrate 200 and a spacer lower surface CS_L facing the spacer upper surface CS_H. The spacer upper surface CS_H has an area greater than an area of the spacer lower surface CS_L. For example, the spacer upper surface CS_H and the spacer lower surface CS_L may have circular shapes, and the diameter or radius of the spacer upper surface CS_H may be greater than the diameter or radius, respectively, of the spacer lower surface CS_L.

The upper surface of the first substrate 100 may be overlapped with the spacer lower surface CS_L and may be flat.

In a conventional display apparatus, a step difference occurs on the upper surface of the first substrate, which is overlapped with the spacer lower surface. In addition, although the upper surface of the first substrate is flat, the alignment layer may be damaged since an area which absorbs a movement of the spacer when a vibration or an external impact is applied to the display apparatus is small. Therefore, the damaged alignment layer does not properly control the liquid crystal molecules, and thus the light leakage occurs in the area corresponding to the damaged alignment layer.

In the display apparatus 10 according to the exemplary embodiments of the present inventive concept, the upper surface of the first substrate, which is overlapped with the spacer lower surface, is flat and the area in which the spacer is movable is increased. Thus, the alignment layer may be protected from being damaged and light leakage may be prevented or decreased. As a result, the display quality of the display apparatus 10 may be improved.

Each of the spacer upper surface CS_H and the spacer lower surface CS_L may have a circular shape. That is, the spacer CS may have a circular truncated cone or frustoconical shape.

However, the shape of the spacer upper surface CS_H and the spacer lower surface CS_L should not be limited to the frustoconical shape. For instance, each of the spacer upper surface CS_H and the spacer lower surface CS_L may have an oval shape or a polygonal shape, e.g., triangular shape, a rectangular shape, etc.

When the spacer lower surface CS_L has a circular shape, a radius (r) of the spacer lower surface CS_L is greater than or equal to about 1 micrometer and less than or equal to about 6 micrometers. When the radius (r) of the spacer lower surface CS_L is less than about 1 micrometers, the cell gap may be difficult to maintain since the area of the spacer lower surface CS_L is narrow, and when the radius (r) of the spacer lower surface CS_L exceeds about 6 micrometers, the spacer CS may be overlapped with the contact hole CH.

The spacer CS may be overlapped with the black matrix BM. In addition, the spacer CS may be overlapped with a non-display area NDA. The spacer CS may be disposed at a position spaced apart from the contact hole CH.

Figure 5:
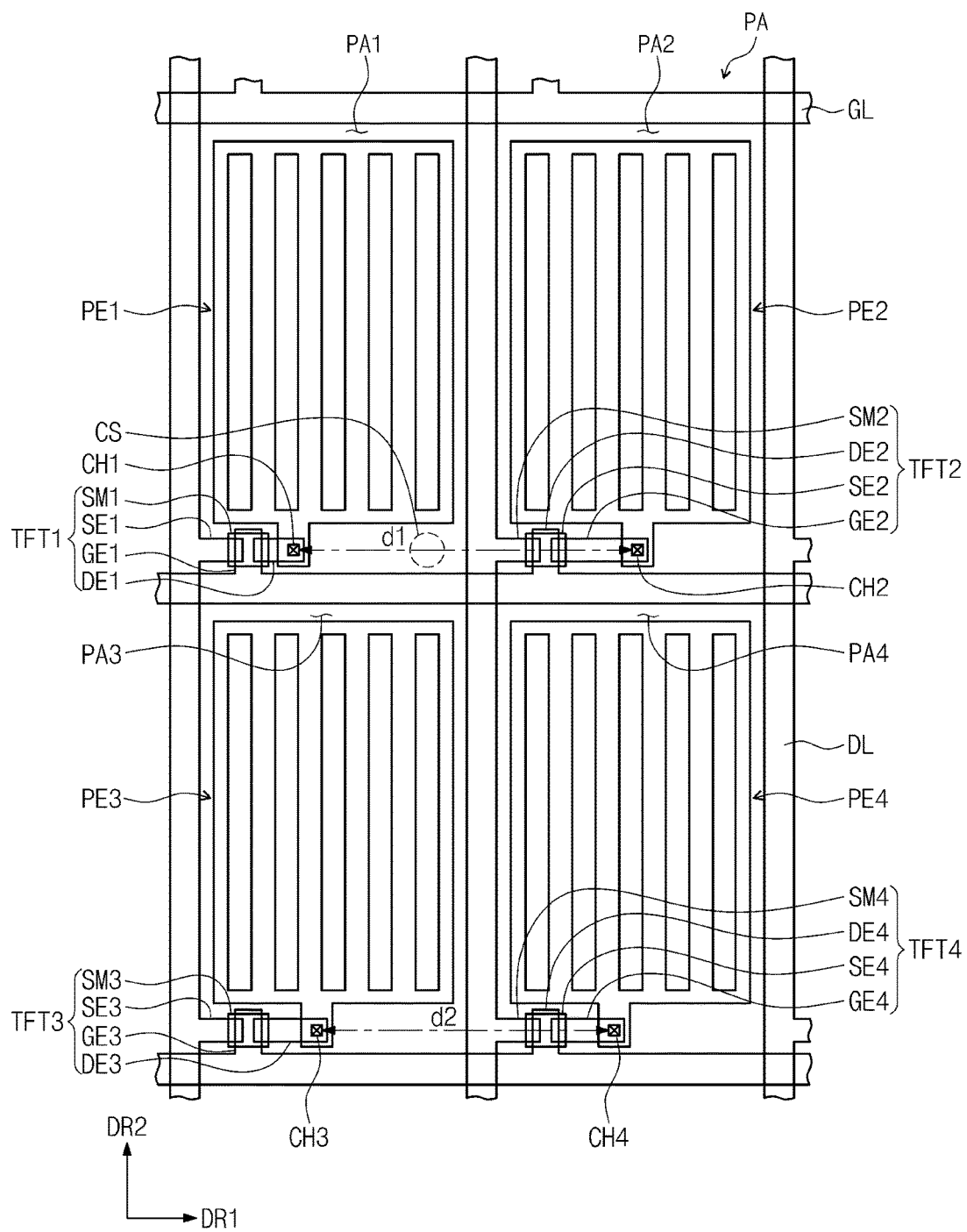
FIG. 5 is a plan view showing a pixel area according to an exemplary embodiment of the present disclosure.

FIG. 5 is a plan view showing a pixel area according to exemplary embodiments of the present disclosure.

As described above, the first substrate 100 includes the pixel areas PA defined by the gate lines GL and the data lines DL.

Each of the pixel areas PA includes at least one thin film transistor TFT and the pixel electrode PE to drive the liquid crystal molecules.

Referring to FIG. 5, the pixel electrode PE includes a first pixel electrode PE1, a second pixel electrode PE2 disposed adjacent to the first pixel electrode PE1 in a first direction DR1, a third pixel electrode PE3 disposed adjacent to the first pixel electrode PE1 in a second direction DR1, and a fourth pixel electrode PE4 disposed adjacent to the third pixel electrode PE3 in the first direction DR1.

Each of the pixel areas PA1, PA2, PA3, and PA4 includes a contact hole CH, including a first contact hole CH1 connected to the first pixel electrode PE1, a second contact hole CH2 connected to the second pixel electrode PE2, a third contact hole CH3 connected to the third pixel electrode PE3, and a fourth contact hole CH4 connected to the fourth pixel electrode PE4.

The first to fourth contact holes CH1, CH2, CH3, and CH4 connect pixel electrodes PE1, PE2, PE3, and PE4 to the drain electrodes DE1, DE2, DE3, and DE4 in each of the first to fourth pixel areas PA1, PA2, PA3, and PA4, respectively.

In addition, when the plural contact holes CH1, CH2, CH3, and CH4 are disposed in the pixel areas PA1, PA2, PA3, and PA4, the spacer CS is not overlapped with the contact holes CH1, CH2, CH3, and CH4.

Each of the pixel areas PA1, PA2, PA3, and PA4 includes a thin film transistor TFT, i.e., a first thin film transistor TFT1 connected to the first pixel electrode PE1 through the first contact hole CH1, a second thin film transistor TFT2 connected to the second pixel electrode PE2 through the second contact hole CH2 and disposed adjacent to the first thin film transistor TFT1 in the first direction, a third thin film transistor TFT3 connected to the third pixel electrode PE3 through the third contact hole CH3 and disposed adjacent to the first thin film transistor TFT1 in the second direction DR2 substantially vertical to the first direction DR1, and a fourth thin film transistor TFT4 connected to the fourth pixel electrode PE4 through the fourth contact hole CH4 and disposed adjacent to the third thin film transistor TFT3 in the first direction DR1.

The pixel areas PA include a first pixel area PA1, a second pixel area PA2, a third pixel area PA3, and a fourth pixel area PA4.

The first pixel area PA1 includes the first pixel electrode PE1 and the first thin film transistor TFT1 connected to the first pixel electrode PE1 through the first contact hole CH1.

The first thin film transistor TFT1 includes a first gate electrode GE1, a first semiconductor pattern SM1, a first source electrode SE1, and a first drain electrode DE1.

The second pixel area PA2 is disposed adjacent to the first pixel area PA1 in the first direction DR1 and includes the second pixel electrode PE2 and the second thin film transistor TFT2 connected to the second pixel electrode PE2 through the second contact hole CH2. The spacer CS is spaced apart from the first and second contact holes CH1 and CH2. For example, the spacer CS is spaced between the first and second contact holes CH1 and CH2.

The second thin film transistor TFT2 includes a second gate electrode GE2, a second semiconductor pattern SM2, a second source electrode SE2, and a second drain electrode DE2.

The third pixel area PA3 is disposed adjacent to the first pixel area PA1 in the second direction DR2 and includes the third pixel electrode PE3 and the third thin film transistor TFT3 connected to the third pixel electrode PE3 through the third contact hole CH3.

The third thin film transistor TFT3 includes a third gate electrode GE3, a third semiconductor pattern SM3, a third source electrode SE3, and a third drain electrode DE3.

The fourth pixel area PA4 is disposed adjacent to the third pixel area PA3 in the first direction DR1, disposed adjacent to the second pixel area PA2 in the second direction DR2, and includes the fourth pixel electrode PE4 and the fourth thin film transistor TFT4 connected to the fourth pixel electrode PE4 through the fourth contact hole CH4.

The fourth thin film transistor TFT4 includes a fourth gate electrode GE4, a fourth semiconductor pattern SM4, a fourth source electrode SE4, and a fourth drain electrode DE4.

The spacer CS may be disposed at a position between the first contact hole CH1 and the second contact hole CH2, but aspects should not be limited thereto or thereby. For example, the spacer CS may be disposed at a position between the third contact hole CH3 and the fourth contact hole CH4.

Among the position at which the first contact hole CH1 is disposed in the first pixel area PA1 and the position at which the second contact hole CH2 is disposed in the second pixel area PA2, at least one position may be different from a position at which the contact hole is disposed in at least one pixel area of the other pixel areas, the positions of the contact holes CH1 and CH2 and the contact holes in the other pixel areas being relative within the pixels areas.

For instance, as shown in FIG. 5, the position at which the third contact hole CH3 is disposed in the third pixel area PA3 is the same, relative to the respective pixel area, as the position at which the fourth contact hole CH4 is disposed in the fourth pixel area PA4. However, each of the position at which the first contact hole CH1 is disposed in the first pixel area PA1 and the position at which the second contact hole CH2 is disposed in the second pixel area PA2 is different from the position at which the third contact hole CH3 is disposed in the third pixel area PA3 and the fourth pixel area PA4. Because the spacer CS is disposed between the first contact hole CH1 and the second contact hole CH2, the area in which the spacer CS is movable is increased or the area in which the movement of the spacer CS is absorbed is increased, and thus the alignment layer may be prevented from being damaged.

In FIG. 5, each of the position at which the first contact hole CH1 is disposed in the first pixel area PA1 and the position at which the second contact hole CH2 is disposed in the second pixel area PA2 is different from the position at which the third contact hole CH3 is disposed in the third pixel area PA3 and the position at which the fourth contact hole CH4 is disposed in the fourth pixel area PA4, but only the position at which the first contact hole CH1 is disposed in the first pixel area PA1 may be different from the position at which the third contact hole CH3 is disposed in the third pixel area PA3 and the position at which the fourth contact hole CH4 is disposed in the fourth pixel area PA4, and the position at which the second contact hole CH2 is disposed in the second pixel area PA2 may be the same as the position at which the third contact hole CH3 is disposed in the third pixel area PA3 and the position at which the fourth contact hole CH4 is disposed in the fourth pixel area PA4, so as to increase the area in which the spacer CS is movable or increase the area that absorbs the movement of the spacer CS. On the contrary, only the position at which the second contact hole CH2 is disposed in the second pixel area PA2 may be different from the position at which the third contact hole CH3 is disposed in the third pixel area PA3 and the position at which the fourth contact hole CH4 is disposed in the fourth pixel area PA4, and the position at which the first contact hole CH1 is disposed in the first pixel area PA1 may be the same as the position at which the third contact hole CH3 is disposed in the third pixel area PA3 and the position at which the fourth contact hole CH4 is disposed in the fourth pixel area PA4.

A distance d1 between the first contact hole CH1 and the second contact hole CH2 may be different from a distance d2 between the third contact hole CH3 and the fourth contact hole CH4.

The distance d1 between the first contact hole CH1 and the second contact hole CH2 may be longer than the distance d2 between the third contact hole CH3 and the fourth contact hole CH4. That is, since the distance d1 between the first contact hole CH1 and the second contact hole CH2, in which the spacer CS is disposed, is longer than the distance d2, the area available to absorb the movement of the spacer CS due to vibration or external impact may be increased. Thus, the light leakage may be reduced in the area corresponding to the damaged alignment layer.

In the conventional display apparatus, the alignment layer is scratched by the spacer since the area that absorbs the movement of the spacer due to the vibration evaluation or the external impact is small. Therefore, the damaged alignment layer does not properly control the liquid crystal molecules, and thus the light leakage occurs in the area corresponding to the damaged alignment layer.

However, in the display apparatus 10 according to the present exemplary embodiment, the spacer CS is disposed between the first contact hole CH1 and the second contact hole CH2 and the distance d1 between the first contact hole CH1 and the second contact hole CH2 is longer than the distance d2 between the third contact hole CH3 and the fourth contact hole CH4, the area that absorbs the movement of the spacer is increased. Thus, the alignment layer may be protected from being damaged and light leakage may be decreased or prevented. As a result, the display quality of the display apparatus 10 may be improved.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus comprising:
   a first substrate that includes pixel areas including a first pixel area and a second pixel area, the first pixel area and the second pixel area being adjacent to each other in a first direction;
   a second substrate that faces the first substrate; and a spacer disposed on the second substrate to extend toward the first substrate, wherein each of the pixel areas comprises:
a pixel electrode;
a contact hole; and
a thin film transistor connected to the pixel electrode through the contact hole, wherein the first pixel area comprises a first contact hole, the second pixel area comprises a second contact hole, the spacer is disposed at a position between the first contact hole and the second contact hole, wherein a lower surface of the spacer directly contacts a top surface of the first substrate, and wherein a portion of the top surface of the first substrate between the first contact hole and the second contact hole and overlapping the first and second contact holes is entirely flat.

2. The display apparatus of claim 1, further comprising:
the first pixel area comprising a first pixel electrode;
the second pixel area comprising a second pixel electrode;
a third pixel area comprising a third pixel electrode, the third pixel area being adjacent to the first pixel area in a second direction, the second direction being substantially perpendicular to the first direction; and
a fourth pixel area comprising a fourth pixel electrode, the fourth pixel area being adjacent to the third pixel area in the first direction and adjacent to the second pixel area in the second direction.

3. The display apparatus of claim 2, wherein:
the first pixel electrode extends into the first contact hole;
the second pixel electrode extends into the second contact hole;
the third pixel electrode extends into a third contact hole; and
the fourth pixel electrode extends into a fourth contact hole.

4. The display apparatus of claim 3, wherein:
the first pixel area comprises a first thin film transistor connected to the first pixel electrode through the first contact hole;
the second pixel area comprises a second thin film transistor connected to the second pixel electrode through the second contact hole;
the third pixel area comprises a third thin film transistor connected to the third pixel electrode through the third contact hole; and
the fourth pixel area comprises a fourth thin film transistor connected to the fourth pixel electrode through the fourth contact hole.

5. The display apparatus of claim 4, wherein the distance between the first contact hole and the second contact hole is different from the distance between the third contact hole and the fourth contact hole.

6. The display apparatus of claim 4, wherein the distance between the first contact hole and the second contact hole is greater than the distance between the third contact hole and the fourth contact hole.

7. The display apparatus of claim 1, further comprising spacers disposed on the second substrate that extend toward the first substrate, wherein a number of the spacers is in a range from about 1/200 to about 1/100 of the pixel areas.

8. The display apparatus of claim 1, further comprising:
the first pixel area comprising the first pixel electrode and the first thin film transistor;
the second pixel area comprising the second pixel electrode and the second thin film transistor;
a third pixel area comprising a third pixel electrode and a third thin film transistor, the third pixel area being adjacent to the first pixel area in a second direction substantially perpendicular to the first direction; and
a fourth pixel area comprising a fourth pixel electrode and a fourth thin film transistor, the fourth pixel area being adjacent to the third pixel area in the first direction and adjacent to the second pixel area in the second direction.

9. The display apparatus of claim 8, wherein each of the pixel areas further comprises:
a display area in which an image is displayed; and
a non-display area in which the image is not displayed, wherein the spacer is disposed in the non-display area.

10. The display apparatus of claim 1, wherein the spacer comprises a spacer upper surface disposed to contact a lower surface of the second substrate and a spacer lower surface facing the spacer upper surface, and the spacer upper surface has an area greater than an area of the spacer lower surface.

11. The display apparatus of claim 10, wherein an upper surface of the first substrate is overlapped with the spacer lower surface and is flat.

12. The display apparatus of claim 10, wherein the spacer lower surface has a circular shape.

13. The display apparatus of claim 12, wherein the spacer lower surface has a radius of about 1 micrometer to about 6 micrometers.

14. The display apparatus of claim 1, wherein the spacer contacts the first substrate and second substrate.

15. The display apparatus of claim 1, wherein a height of the spacer is substantially the same as a cell gap between the first substrate and the second substrate.

16. The display apparatus of claim 1, further comprising:
a liquid crystal layer disposed between the first substrate and the second substrate,
wherein the first substrate comprises a first alignment layer disposed between the first substrate and the liquid crystal layer, and
wherein the second substrate comprises a second alignment layer disposed between the second substrate and the liquid crystal layer.

17. The display apparatus of claim 1, wherein the first substrate further comprises:
a first base substrate; and
a common electrode disposed on the first base substrate and partially overlapped with the pixel electrode,
wherein the pixel electrode faces the common electrode.

18. The display apparatus of claim 1, wherein each of the pixel areas comprises:
one pixel electrode; and
one thin film transistor connected to the pixel electrode through one contact hole.

19. The display apparatus of claim 1, wherein the spacer is spaced apart from the contact hole.

20. The display apparatus of claim 3, wherein one of the first contact hole and the second contact hole is positioned at a different relative location from the relative locations of the other of the first contact hole and the second contact hole, the third contact hole, and the fourth contact hole, the relative locations being relative locations within the respective pixel areas.

* * * * *